Jan. 20, 1970     R. H. RUSSELL     3,490,272
TEMPERATURE COMPENSATED RESISTANCE MEASUREMENT BRIDGE
Filed Dec. 22, 1966     2 Sheets-Sheet 1

INVENTOR:
Robert H. Russell

ATTORNEYS

Jan. 20, 1970    R. H. RUSSELL    3,490,272
TEMPERATURE COMPENSATED RESISTANCE MEASUREMENT BRIDGE
Filed Dec. 22, 1966    2 Sheets-Sheet 2

INVENTOR:
Robert H. Russell
ATTORNEYS

United States Patent Office 3,490,272
Patented Jan. 20, 1970

3,490,272
TEMPERATURE COMPENSATED RESISTANCE MEASUREMENT BRIDGE
Robert H. Russell, Altadena, Calif., assignor, by mesne assignments, to Whittaker Corporation, Los Angeles, Calif.
Filed Dec. 22, 1966, Ser. No. 603,992
Int. Cl. G01d *3/04;* G01l *5/12*
U.S. Cl. 73—88.5                     5 Claims

ABSTRACT OF THE DISCLOSURE

This invention relates to temperature compensation. Specifically, the invention relates to the temperature compensation of a measurement circuit. In particular, the invention relates to the temperature compensation of a resistance measurement wherein the temperature compensation is provided for by temperature-insensitive resistors. The present invention provides for the temperature compensation with temperature-insensitive resistors by using variations of the resistance of the resistance bridge due to temperature to control the current through the bridge and through the temperature-insensitive resistors to cancel out the temperature effects.

---

Resistance measurement bridges may be used to provide for an output signal having a value in accordance with the resistance values of the resistors in the bridge. The bridge usually includes at least four bridge resistors with each resistor in a separate leg of the bridge, and wherein at least one of the four bridge resistors is a variable resistor having a resistance value in accordance with the value of a particular quantity to be measured. For example, if the quantity to be measured is resistance per se, the output signal from the bridge is in accordance with the value of the resistance. However, the value of the resistance may also be in response to some physical quantity. For example, certain types of strain gages exhibit a resistance which vary in accordance with the value of the strain. The resistance bridge may be used to provide an output signal having a value in accordance with the value of resistance of the strain gage, which as indicated above is in accordance with the strain. The resistance bridge may, therefore, be used to measure the value of the strain directly.

In addition to the above, strain gages may be included in transducer structures as a variable resistance element so as to measure other physical quantities such as pressure, acceleration, vibration, etc. As an illustrative example, a pressure transducer may provide for the measurement of pressure by having the pressure to be measured applied to a diaphragm so as to provide for a deformation of the diaphragm in accordance with the pressure. The deformation of the diaphragm produces strain in the diaphragm and strain gages may be attached to the diaphragm to measure the strain.

The strain in the diaphragm is responsive to the value of the pressure which is applied to the diaphragm. The resistance of the strain gage may, therefore, be measured so as to provide a measurement of the pressure. Strain gages may be attached in different manners within various transducer structures so as to provide for other types of measurements. The strain gage, therefore, is a versatile measurement element which may be used to provide for a change in resistance in accordance with different physical quantities.

The most common types of resistance strain gages generally in use are the resistance wire or foil strain gage, and the semiconductor strain gage. The resistance wire or foil strain gage has certain advantages. For example, the resistance wire or foil gage may be constructed of material which is relatively stable with changes in temperature. In addition, the resistance wire or foil gage may be matched fairly easily so that a pair of such resistance wire or foil gages may be used to provide for a temperature compensation within a resistance bridge.

The resistance wire or foil gage also has certain disadvantages. Generally, the resistance wire or foil gages have a relatively low sensitivity to strain. That is, the change in resistance is relatively low with changes of strain. Therefore, the resistance wire or foil strain gages generally have a low gage factor.

Semiconductor strain gages, on the other hand, have certain advantages. The semiconductor strain gage has a relatively high sensitivity to strain and, therefore, has a high gage factor. However, the semiconductor strain gage is temperature sensitive. Also, it is not easy to provide for matched pairs of semiconductor strain gages so that temperature compensation can be achieved by such matched pairs in the resistance bridge. The semiconductor strain gage, therefore, is characterized by a high gage factor, but also experiences changes in resistance with temperature changes and changes in sensitivity of the strain gage with temperature changes.

The present resistance measurement bridges are generally constructed in the following manner. For example, the resistance gage may include a single active element. The term "active element" refers to a variable resistance element included in the bridge which is responsive to the physical quantity. For example as indicated above, the active element may refer to a strain gage. The use of a single active element within the resistance bridge provides for a relatively high temperature sensitivity of the bridge. The temperature sensitivity of the bridge is with respect to both changes in the zero point of the output signal from the bridge with changes in temperature and with respect to changes in sensitivity of the bridge to strain with changes in temperature.

It is, therefore, desirable, especially when using semiconductor strain gages, to include more than a single active element in the resistance bridge so as to provide temperature compensation by connecting the active elements so as to offset each other with respect to temperature effects. The usual resistance bridges, therefore, include at least two active elements and often include four active elements. The active elements are arranged to provide for an increase in the level of the output signal from the resistance bridge since the active elements may be arranged to provide for opposite changes of resistance in accordance with the strain. In addition, the active elements may be arranged so that the resistance changes of the bridge which occur due to temperature changes cancel each other.

If it would be possible to provide for exact matched pairs of active elements such as strain gages, it would be possible to provide for perfect temperature compensation through the use of such matched pairs. However, it is impossible to provide for such perfect matching of strain gages and the resistance bridges currently in use still experience some errors in the output signal due to temperature changes. The errors in the output signals generally are of two types. The first type of error is a change in the zero point or the value of the output signal with no strain as the temperature is changed. For example, the value of the output signal with no strain applied might increase or decrease as the temperature increases. The second type of error is a change in the sensitivity of the bridge, or specifically of the strain gage as the temperature is changed. Therefore, the strain gage might produce a different resistance change for a constant strain over a range of temperatures. The sensitivity of the bridge in accordance with temperature changes may, therefore, also increase or decrease, depending upon the particular temperature sensitivity characteristic of the strain gage.

The prior art measurement bridges use temperature compensating resistors for compensating the zero point and sensitivity temperature errors in the output signals. The prior art temperature compensation using temperature compensating resistors included at least one temperature compensating resistor which had a particular resistance characteristic with changes in temperature. Therefore, this one temperature compensating resistor would be considered to be a temperature-sensitive resistor. In order to provide for an accurate compensation of the temperature effects, both the value and the temperature characteristic of this one temperature-sensitive resistor had to be adjusted to the proper value. It is difficult to provide for such a dual adjustment. The compensating procedures for the prior art temperature-compensated resistance bridges were, therefore, difficult to accomplish and required a relatively long length of time.

The present invention provides for the temperature compensation of a resistance bridge using temperature-compensating resistors arranged in a particular relationship with the resistance bridge and wherein all of the temperature-compensating resistors are temperature insensitive. The present invention uses resistance changes of the resistance bridge itself due to temperature to adjust for the current flow through the bridge to provide for compensation of the temperature effects in conjunction with the external temperature-insensitive compensating resistors. A clearer understanding of the invention will be had with reference to the following descriptions and drawings wherein:

Figure 1:
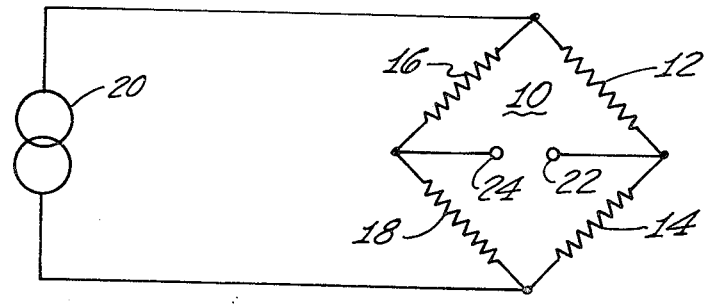
FIGURE 1 illustrates a resistance measurement bridge using a constant current source.

In FIGURE 1, a resistance bridge 10 includes four resistors 12, 14, 16 and 18, each forming a leg of the bridge. A constant current source 20 provides a constant current through the bridge and resistors 12 and 14 constitute a first branch of the bridge and resistors 16 and 18 constitute a second parallel branch of the bridge. Resistors 12 and 14, therefore, act as a voltage divider circuit and the voltage at a terminal 22 is determined by the ratio of the resistors 12 and 14. The resistors 16 and 18 also act as a voltage divider circuit and the voltage at a terminal 24 is in accordance with the ratio of the resistors 16 and 18.

When the resistors 12 and 14 are in the same ratio as the resistors 16 and 18, the voltage across the terminals 22 and 24 is zero which indicates that the bridge is in a balanced condition. When, however, one of the resistors such as resistor 12 is a variable resistance which is responsive to some physical quantity, the voltage at terminal 22 changes in accordance with the change in resistance of the resistor 12 and a voltage appears across the terminals 22 and 24 which is in accordance with the change in resistance of resistor 12. Usually the bridge uses at least two variable resistors which are responsive to the physical quantity. It is to be appreciated that although the variable resistors may be described as semiconductor strain gages, other types of strain gages or other types of variable resistance elements may be used.

When the resistance of the active element 12 has variations in accordance with temperature changes such as resistance variations or sensitivity variations, the output signal across the terminals 22 and 24 is affected by these temperature variations of the active element 12. It is, therefore, desirable to provide for temperature compensation of the active element 12. One of the other elements, specifically resistor 14 or the resistor 16 may be arranged to experience substantially the same temperature conditions as the active element 12 and the changes in resistance of resistor 14 or resistor 16 may be used to provide for a temperature compensation of the resistance changes of the resistor 12.

The resistor element 14 or the resistor element 16 also may be an active element which has a change in resistance opposite to the change in resistance of the active element 12 when both resistors respond to a particular physical quality. The output signal across the terminals 22 and 24 therefore may be increased while providing for the temperature compensation. Also, all four of the resistance elements of the bridge of FIGURE 1 may be active elements which are arranged so as to provide for temperature compensation and increased output signal from the bridge.

The temperature compensation described above depends to a large degree on how accurately the variable resistor elements of the bridge 10 can be matched. That is, when the variable resistor elements are very accurately matched, the bridge 10 of FIGURE 1 has a very stable temperature characteristic. However, it is impossible to provide for a perfect match and, even though the use of substantially matched active elements provides for a great reduction in the effect of temperature on the bridge 10, some temperature effects still remain.

Figure 2:
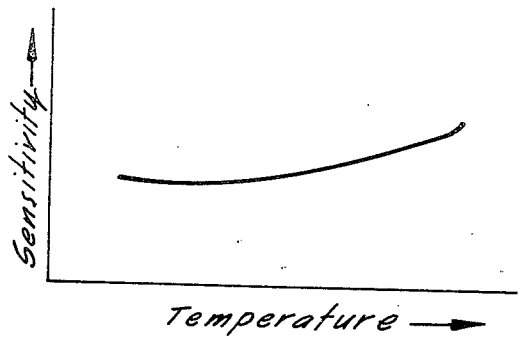
FIGURE 2 is a representative curve of the sensitivity of the bridge of FIGURE 1 with temperature changes.

For example, as shown in FIGURE 2, the bridge may experience a change in the sensitivity of the bridge with increased temperature. In FIGURE 2, the sensitivity is shown to increase as the temperature rises, but, depending upon the particular characteristics of the bridge the sensitivity may also decrease. It is not important whether the sensitivity increases or decreases, but it is important that the sensitivity is other than constant for temperature changes.

Figure 3:
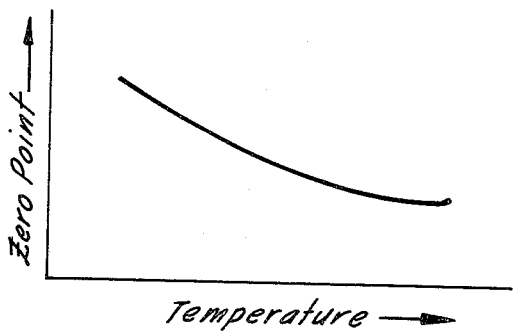
FIGURE 3 is a representative curve of the zero point of the bridge of FIGURE 1 with temperature changes.

In addition, as shown in FIGURE 3, the zero point, or the value of an output signal across the terminals 22 and 24 of the bridge of FIGURE 1 with a zero level for the physical quantity also changes in accordance with temperature. In FIGURE 3, the change in zero point of the bridge is shown to decrease with an increasing temperature, but again it is to be appreciated that the particular physical characteristics of the active elements and the manner in which they are arranged in the bridge determines whether the zero point increases or decreases.

Figure 4:
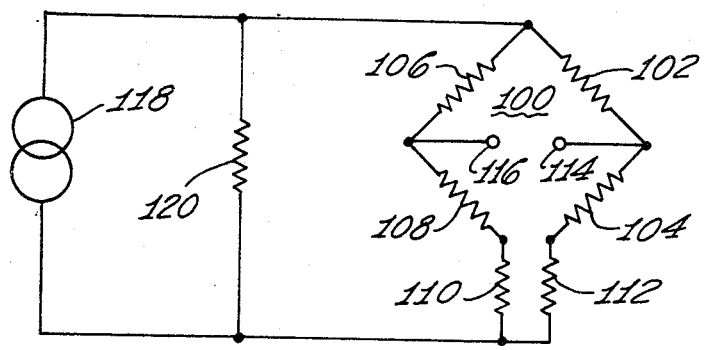
FIGURE 4 is a prior art method of providing temperature compensation for a bridge of the type shown in FIGURE 1.

As can be seen with reference to FIGURES 2 and 3, it is desirable to provide for a compensation of the temperature errors in a bridge such as the bridge of FIGURE 1 with changes of temperature. FIGURE 4 illustrates a prior art method of providing such a temperature compensation. In FIGURE 4, a resistance bridge 100 includes four resistance elements 102, 104, 106 and 108. The four resistance elements are connected at three junction points to form two branches wherein the branches are closed at one end and open at the other end. In addition, a pair of resistors 110 and 112 are connected in series with the open ends of the branches and are then connected together at the other end of the resistors 110 and 112.

Depending upon the particular temperature error in the bridge 100, one of the resistors, either resistor 110 or resistor 112, is a temperature-sensitive resistor which provides a variation in resistance in accordance with changes in temperature. Assuming that resistor 110 is the temperature-sensitive resistor, the resistor 110 provides for a change in resistance which offsets the change in resistance provided for by the branch of the bridge 100 including the resistors 106 and 108 relative to the branch of the bridge 100 including the resistors 102 and 104. The overall effect is to produce a bridge which remains relatively stable in resistance over varying temperature. This type of temperature compensation using the temperature-sensitive resistor 110 provides for compensation of the zero point. It can be seen that one of the branches of the bridge 100 varies with respect to the other branch and that the temperature-compensating resistor 110 may be used to compensate for this variation which would affect the zero point of the output signal across a pair of terminals 114 and 116. The resistor 112 is merely used to provide for a balance in the two branches of the bridge circuit 100. The bridge 100 is now balanced so that the zero point remains constant with changes in temperature.

The above zero point compensation only holds when there is no physical quantity to be measured. Assuming as before that the bridge resistors 102–108 are semiconductor strain gages, as long as no strain is applied the output signal across the output terminals 114 and 116 are either zero or at some particular value in accordance with the values of the various resistors and the value of a constant current source 118. This zero point output signal remains constant with changes in temperature. However, as soon as strain is applied the resistors change in accordance with the strain and in addition the sensitivity of the resistors changes with temperature.

The change in resistance of the various strain gages is therefore not only in accordance with the strain but is also in accordance with the temperature. The currents through the branches of the bridge 100 change in accordance with the change in sensitivity thereby producing a temperature error in the output signal. It is, therefore, desirable, to provide for compensation of the change in sensitivity of the bridge 100 with changes in temperature. A resistor 120 is used to provide a temperature compensation for the change in sensitivity. The resistor 120 is usually a temperature-insensitive resistor which is in parallel with the constant current source 118. The current from the constant current source 118, therefore, divides between the resistor 120 and the resistance formed by the bridge 100 and the compensation resistors 110 and 112.

If the bridge 100 has no sensitivity changes with changes in temperature, the resistance of the total bridge, including the compensating resistors 110 and 112, remains substantially constant for all values of strain since the bridge resistors vary in opposite directions in accordance with the strain, but the output signal across the terminals 114 and 116 varies in accordance with the changes in the ratio of the resistors in the branches of the bridge circuit. However, the sensitivity changes due to temperature provide for variations in the total resistance of the bridge so that the current from the constant current source divides in a different ratio between the bridge and the resistor 120 in accordance with the change in sensitivity. The value of the resistor 120 is, therefore, chosen so that as the resistance of the bridge changes in accordance with the changes in sensitivity, the current through the bridge is varied so as to compensate for the changes in resistance. The resistor 120 therefore draws more or less current in accordance with the resistance of the bridge so that the value of the resistor 120 may be chosen to provide a variable current through the bridge as the bridge resistance changes which variable current compensates for the effect of the change in resistance on the output signal from the bridge. The change in current through the bridge as indicated above compensates for the change in the sensitivity of the bridge and the value of the resistor 120 is carefully chosen so as to provide for an effective constant sensitivity of the bridge.

The difficulty with temperature compensation as provided for in FIGURE 4 is that the compensating resistor, for example the resistor 110, must be temperature sensitive. Not only must the value of the resistor 110 be adjusted to a correct level, but, in addition, the temperature characteristic of the resistsor 110 must be adjusted. It, therefore, becomes difficult to provide for the temperature compensation of the bridge using the method of FIGURE 4. In addition, in order for the temperature compensation as provided for in FIGURE 4 to be effective, the temperature-sensitive resistor, for example the resistor 110, must be subjected to the same temperature conditions as the variable resistor element in the bridge 100 and it is often impossible to locate the temperature-sensitive resistor at the proper position. Also since the resistor 110 must be located at least in the same area as the bridge resistors it is not possible to provide for the temperature compensation at a remote position.

Figure 5:
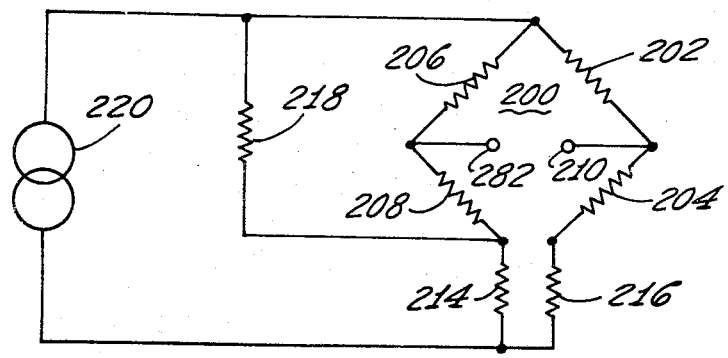
FIGURE 5 is a first embodiment of the present invention illustrating the temperature compensation of a resistance bridge such as the bridge of FIGURE 1 using temperature-insensitive resistors.

Temperature compensation according to the present invention is provided for in FIGURE 5 wherein all the temperature-compensating resistors are temperature insensitive and do not have to be subjected to the same temperature conditions as the bridge resistors. The temperature-compensating resistors used in FIGURE 5, therefore, may be provided at positions remote to the position of the bridge.

In FIGURE 5, a bridge 200 includes four bridge resistors 202, 204, 206 and 208. A pair of output terminals 210 and 212 are used to provide an output signal in accordance with variations in resistance of the bridge resistors. The resistors may be responsive to some physical quantity and the resistors may be, for example, semiconductor strain gages. The resistors 202 through 208 are joined at three junction points to provide two branches having one closed end and one open end. A pair of resistors 214 and 216 are each in series with one of the branches and are connected together at an additional junction point. The resistors 214 and 216 are used to provide temperature compensation. An additional resistor 218 is connected in parallel across the bridge 200 to a junction point between the resistors 214 and 208 and the resistor 218 is in series with the resistor 214. Finally, a constant current source 220 is used to provide a constant current to the bridge circuit of FIGURE 5.

In the circuit of FIGURE 5 the temperature compensation is provided for by the resistors 214 and 218 with the resistor 216 balancing the current through the bridge. None of these resistors is temperature sensitive and the resistors are deliberately chosen to be temperature insensitive. In addition, the resistors 214, 216 and 218 may be positioned at a remote point away from the bridge which is stable in temperature so that the resistors do not experience large changes of temperature.

The temperature compensation of the circuit of FIGURE 5 is provided for in the following manner. The constant current source 220 provides a constant current which is initially divided between the resistor 218 and the bridge circuit which includes the four bridge resistors 202, 204, 206 and 208. The resistor 214 which is common to both the bridge circuit 200 and the resistor 218 is in series with one branch of the bridge 200 including the resistors 206 and 208 and is also in series with the resistor 218. The resistor 218 is in parallel across the one branch of the bridge 200 including the resistors 206 and 208. When the temperature changes to produce corresponding changes in the resistance of the bridge circuit 200, the resistance changes of the bridge circuit produce a variation of the amount of current flowing into the bridge circuit. The change in the amount of current flowing into the bridge circuit also varies the current flowing into the resistor 218. As indicated above with reference to FIGURE 4, the value of the resistor 218 may be chosen so as to provide for temperature compensation of changes in sensitivity.

As the currents through the bridge and the resistor 218 change in accordance with the changes in sensitivity of the bridge the current through the resistor 214 also changes. The value of the resistor 214 is, therefore, chosen so that the changes in current through the resistor 214 compensate for changes in the zero point of the bridge circuit with changes of temperature. As can be seen in FIGURE 5, the resistor 214 does not have to be a temperature-sensitive resistor as does the resistor 110 in FIGURE 4. The resistor 110 in FIGURE 4 must itself produce a variation in current by a variation of resistance of the resistor 110 with changes in temperature. The resistor 214 in FIGURE 5 receives a variation in current due to the changes in resistance of the bridge itself.

The temperature errors of the bridge, therefore, provide a change of resistance of the bridge which varies the current flowing through the bridge and the current flowing through the resistors 214 and 218. The value of the resistor 218 is chosen so that the change in current through the resistor 218 provides a compensation for the change in sensitivity of the bridge with temperature. In addition, the current through the bridge and the resistor 218 is supplied in series through the resistor 214 and the value of the resistor 214 is chosen so as to provide compensation for the change in zero point of the bridge 200 with changes in temperature.

As can be seen in FIGURE 5, the compensation for temperature errors of the bridge 200 is accomplished using resistors 214 and 218 and the compensation is provided for by the resistance variations produced by the bridge itself. The resistors 214 and 218 do not have any temperature-sensitive properties and are temperature-insensitive resistors since the compensation is provided for by the temperature-sensitive nature of the bridge 200 itself.

Figure 6:
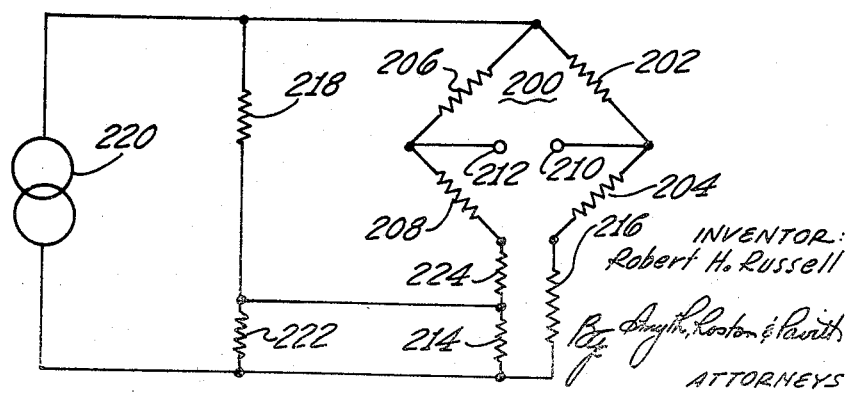
FIGURE 6 is a second embodiment of the present invention illustrating a modified form of the temperature compensated bridge of FIGURE 5.

In FIGURE 6, a second embodiment of the invention is shown which is a modification of the temperature-compensating circuit of FIGURE 5. In FIGURE 6, the bridge 200 includes four bridge resistors 202, 204, 206 and 208. The output of the bridge is taken across a pair of terminals 210 and 212. A pair of temperature-insensitive resistors 214 and 216 are connected in series with the two branches of the bridge and a third temperature-insensitive resistor 218 is connected in parallel across the bridge. The constant current source 220 supplies current to the circuit. The embodiment of FIGURE 6 as described so far is identical to that in FIGURE 5. However, in FIGURE 6, a pair of additional temperature-insensitive resistors 222 and 224 are provided.

Resistor 222 is in series with the resistor 218 and in parallel with the resistor 214. The resistor 224 is in series between the resistor 208 and the resistor 214. The resistor 222 and 224 may be provided to assist in adjusting the value of the circuit of FIGURE 6 to produce temperature compensation whereas in FIGURE 5 it is necessary to provide for the exact values for the resistors 218 and 214 so as to provide temperature compensation. In FIGURE 6 it is only necessary to provide for a ratio of the resistors 222 and 218 and a ratio of the resistors 214 and 224. For example, the resistors 218 and 222 may be combined as a potentiometer with a variable arm and the resistors 214 and 224 may also be combined as a potentiometer with a variable arm. The embodiment of FIGURE 6 works essentially in the same manner as the embodiment of FIGURE 5 wherein changes in resistance of the bridge itself produce a change in current through tde bridge and a change in current through the temperature compensating resistors. The changes in current are used to provide for compensation of zero point and sensitivity of the bridge. In the circuit of FIGURE 6, the ratio of the resistors is adjusted so that the currents flowing in the circuit compensates for changes in the zero point and sensitivity of the bridge due to the resistance changes of the bridge.

The present invention, therefore, provides for the temperature compensation of a measurement bridge using temperature-insensitive elements. These temperature-insensitive elements, such as resistors, may be provided for at remote positions and do not have to be located adjacent to the active portions of the bridge. It is not necessary with the present invention to provide temperature compensation by having a temperature-sensitive element experiencing the same temperature conditions as the active elements of the bridge. Also, it is not necessary to accurately choose a temperature characteristic for the temperature-sensitive element as would be necessary with the prior art methods of temperature compensation. The use of temperature-insensitive elements for temperature compensating the bridge as with the present invention therefore provides for a simpler and more reliable method of temperature compensation.

I claim:
1. A temperature compensated resistance measurement bridge, including:
   a first bridge resistor and a second bridge resistor interconnected at first ends at a first junction point to form a first branch,
   a third bridge resistor and a fourth bridge resistor interconnected at first ends at a second junction point and with at least one of the resistors of the bridge resistor and the third bridge resistor interconnected at second ends to form a third junction point and with at least one of the resistors of the resistance measurement bridge being strain responsive,
   a first temperature insensitive resistor and a second temperature insensitive resistor interconnected at first ends at a fourth junction point and with the second end of the first temperature insensitive resistor and the second end of the second bridge resistor interconnected at a fifth junction point and with the second end of the second temperature insensitive resistor and the second end of the fourth bridge resistor interconnected at a sixth junction point and with the first and second temperature insensitive resistors having values to compensate the resistance measurement bridge for changes in the zero point of the resistance measurement bridge with changes in temperature,
   a third temperature insensitive resistor connected between the third junction point and the fifth junction point and with the third temperature insensitive resistor having a value to compensate the resistance measurement bridge for changes in sensitivity of the strain responsive resistance with changes in temperature, and
   a source of constant current energy applied between the third junction point and the fourth junction point.

2. The temperature compensated resistance measurement bridge of claim 1 additionally including a fourth temperature insensitive resistor connected between the fourth junction point and the fifth junction point and a sixth temperature insensitive resistor connected in series between the second end of the second bridge resistor and the fifth junction point.

3. The temperature compensated resistance measurement bridge of claim 1 wherein at least two of the bridge resistors are variable in response to a physical phenomenon.

4. A temperature compensated resistance measurement bridge for use with a source of constant current, including:
   first, second, third and fourth bridge resistors interconnected at three junction points to form two branches interconnected at one end and open at the other end and with each branch containing two bridge resistors and with at least one of the resistors of the resistance measurement bridge being strain responsive,
   a first temperature insensitive resistor and a second temperature insensitive resistor each connected in series with one of the branches and each connected to a common point, and a third temperature insensitive resistor connected in parallel across one of the branches and in series with the corresponding one of the first and second temperature insensitive resistors to provide compensation of the bridge for sensitivity changes of the strain responsive resistor due to temperature by the third temperature insensitive resistor and to provide compensation of the bridge for changes in the zero point of the bridge due to temperature by the corresponding one of the first and second temperature insensitive resistors.

5. The temperature compensated resistance measurement bridge of claim 4 wherein the two branches include variable resistors and wherein the variable resistors vary in opposite directions to provide a substantially constant resistance value across the two branches.

References Cited

UNITED STATES PATENTS

| | | | |
|---|---|---|---|
| 3,178,983 | 4/1965 | Ruge | 73—88.5 X |
| 3,228,240 | 1/1966 | Ormond | 73—88.5 X |
| 3,245,252 | 4/1966 | First et al. | 73—88.5 |

CHARLES A. RUEHL, Primary Examiner.

U.S. Cl. X.R.

73—141